(12) United States Patent
Wheeler

(10) Patent No.: US 6,563,421 B1
(45) Date of Patent: May 13, 2003

(54) SECURITY SYSTEM WITH REMOTE INDICATION

(76) Inventor: Gregory Paul Wheeler, 47 Oxford St., Winchester, MA (US) 01890

( * ) Notice: Subject to any disclaimer, the term of this patent is extended or adjusted under 35 U.S.C. 154(b) by 0 days.

(21) Appl. No.: 09/831,715

(22) PCT Filed: Nov. 12, 1999

(86) PCT No.: PCT/US99/26857
§ 371 (c)(1),
(2), (4) Date: May 14, 2001

(87) PCT Pub. No.: WO00/27676
PCT Pub. Date: May 18, 2000

Related U.S. Application Data

(60) Provisional application No. 60/108,142, filed on Nov. 12, 1998.

(51) Int. Cl.[7] .............................................. B60R 25/10
(52) U.S. Cl. .................. 340/426; 340/539; 340/825.36; 340/5.3; 180/287; 180/289; 307/10.1; 307/10.2
(58) Field of Search ................................. 340/426, 430, 340/539, 825.36, 825.69, 5.1, 5.2, 5.3, 5.7; 307/10.2, 9.1, 10.1; 180/287, 289

(56) References Cited

U.S. PATENT DOCUMENTS

| | | | | |
|---|---|---|---|---|
| 5,506,563 A | * | 4/1996 | Jonic ........................... | 340/426 |
| 5,537,673 A | | 7/1996 | Nagashima et al. | |
| 5,554,966 A | * | 9/1996 | Iijima et al. ................. | 340/687 |
| 5,619,074 A | * | 4/1997 | Berch et al. ................ | 307/10.2 |
| 5,652,564 A | | 7/1997 | Winbush | |
| 5,705,975 A | * | 1/1998 | Serino et al. ................ | 340/426 |
| 5,705,976 A | | 1/1998 | Howard | |
| 5,739,747 A | * | 4/1998 | Flick ........................... | 340/426 |
| 5,739,748 A | * | 4/1998 | Flick ........................... | 340/426 |
| 5,793,283 A | * | 8/1998 | Davis .......................... | 340/426 |
| 5,794,164 A | * | 8/1998 | Beckert et al. ............... | 701/1 |
| 5,831,344 A | * | 11/1998 | Rose, Sr. .................... | 307/10.3 |
| 5,880,673 A | * | 3/1999 | Howard ....................... | 340/426 |
| 5,912,615 A | * | 6/1999 | Kretzmar et al. ........... | 340/426 |
| 5,973,592 A | * | 10/1999 | Flick ........................... | 340/426 |
| 6,028,506 A | | 2/2000 | Xiao | |
| 6,107,914 A | | 8/2000 | Greene | |

* cited by examiner

Primary Examiner—Toan Pham
(74) Attorney, Agent, or Firm—O'Connell Law Firm

(57) ABSTRACT

A security system (10) for providing a remote indication of a breach in security including an electronic device with an electronic device body (12) and a disabling member (14) couplable thereto. The electronic device is disabled by removing the disabling member (14). A security breach causes an alarm signal to be sent to the disabling member (14), which announces the receipt of an alarm signal. The electronic device can be a vehicle sound-reproduction device, and the disabling member (14) can be all or a portion of a face thereof. The alarm signal can be sent first by radio transmission that, if necessary, can be supplemented by a mobile communications transmission. The disabling member (14) could further act as a mobile communications pager and as a mobile telephone. The disabling member (14) could operate to affect operation of a vehicle in which the security system (10) is employed.

31 Claims, 5 Drawing Sheets

SECURITY SYSTEM WITH REMOTE INDICATION

This application claims the benefit of Provisional Application No. 60/108,142, filed Nov. 12, 1998.

TECHNICAL FIELD

The present invention relates generally to security systems. More particularly, disclosed and protected by the present patent is a security system, shown particularly employed relative to a vehicle, that employs a removable disabling member for providing a remote indication of a breach of security in a protected article.

BACKGROUND ART

The prior art certainly discloses a wide variety of security systems for deterring the theft a vehicle itself, for preventing the theft of items within a vehicle, for preventing vandalism, and even for preventing harm to vehicular occupants. Typical security systems are founded on a processor or controller that is functionally connected to one or more vehicle sensors. Such sensors may detect damage to or the opening or jarring of a vehicle's body, doors, trunk, hood, windows, or other elements. Other sensors may detect movement of or within the vehicle. Sensors may comprise ultrasonic or microwave motion detectors, vibration sensors, sound discriminators, differential pressure sensors, or switches. Furthermore, radar sensors may be employed to monitor the area proximate to the vehicle.

Typically, the processor or controller produces an alarm indication in response to a triggering of one of the vehicle sensors. The alarm indication can comprise one or more of a variety of signals including flashing lights and a sounding of the vehicle horn. The controller additionally may cut the vehicle's fuel supply or disable the vehicle's ignition.

Such alarm indications undoubtedly are useful for giving notice of a breach in a vehicle's security in the area immediately surrounding a protected vehicle. However, one considering the matter carefully will realize that an alarm indication immediately proximate to a vehicle notifies only those who are sufficiently close to the vehicle to see or hear the alarm indication. If nobody who cares for the vehicle's security is in that area immediately proximate to the vehicle, then the alarm indication is of substantially no use. Without the vehicle's owner to hear or see the alarm's indication and no bystander sufficiently interested to notify authorities, the alarm indication is of little effect other than to act as a petty nuisance to an otherwise unobstructed intruder.

Advantageously, a number of inventors have recognized this deficiency in traditional alarms and have devised of alarm systems for providing a remote indication of a breach in a vehicle's security. One such system does so by supplementing an audible alarm with a radio transmission to a pager in response to an attempt to enter or otherwise violate the protected vehicle. Another system similarly employs a pager to alert a user of a security breach remotely by transmitting directly from a transmitter within the vehicle a signal that is compatible with common carrier paging signals. The signal is transmitted directly to the common carrier pager. This system advantageously transmits the signal directly to a common carrier pager whereby it operates without requiring the use of the common carrier network whereby usage charges and potential delays are said to be avoided.

Other security schemes are directed more particularly to the protection of a vehicle's stereo system. For example, it has become commonplace for stereos to be provided with a removable faceplate that incorporates the controls for the stereo. When a user leaves the vehicle, the faceplate may be removed to disable the stereo and thereby make it unattractive, and in fact unusable, to thieves. When exploited, removing a stereo's faceplate undeniably comprises an effective method for preventing stereo theft. However, as many owners of such stereos will attest, removing and carrying a faceplate can become a nuisance. As a result, this otherwise effective stereo security means often is not employed.

A further disadvantage would certainly face one seeking to employ both a removable stereo faceplate and an auto security system with a remote indicator since such persons would be forced to carry both the stereo faceplate and the remote indicator to ensure that their auto would remain completely secure. At the very least, carrying both devices would be inconvenient, and at worst such an inconvenience might induce a user to opt not to carry one or both of the devices thereby rendering one or both of the security systems effectively useless.

In light of the foregoing, one will appreciate that there remains a need in the art for a security system that overcomes the previously described deficiencies suffered by prior art systems. It will be still more clear that a security device that does so while providing a number of heretofore unrealized advantages would represent a marked advance in the art.

SUMMARY DISCLOSURE OF THE INVENTION

Advantageously, the present invention sets forth with the broadly stated object of providing a solution to each of the deficiencies left by the prior art while providing a number of heretofore unrealized advantages thereover.

Stated more particularly, a principal object of the invention is to provide a security system capable of providing a user with a remote indication of a breach in a protected article's security.

A further object of the invention is to provide such a security system that simultaneously acts to disable an electronic device thereby providing further security for the electronic device.

Of course, additional objects and advantages of the present invention will be obvious both to one who reads this specification and reviews the accompanying drawings and to one who has an opportunity to make use of an embodiment of the invention.

In accomplishing the aforementioned objects, a most basic embodiment of the invention comprises a security system for providing a remote indication of a breach in security that includes an electronic device with an electronic device body, a disabling member removably and replaceably couplable to the electronic device body, a means for at least partially disabling the electronic device when the disabling member is removed from the electronic device body, a means for sensing a breach in security, a means for sending an alarm signal to the disabling member in response to a sensing of a breach of security by the means for sensing a breach in security, a means operably associated with the disabling member for receiving an alarm signal sent by the means for sending an alarm signal, and a means operably associated with the disabling member for announcing a receipt of an alarm signal by the means for receiving an alarm signal. With this, the disabling member functions not only to disable the electronic device when it is removed from the electronic device body but it also functions to provide a remote indication of a security breach.

It will be appreciated that particular methods and devices for carrying forth each of the means mentioned above and in the remainder of the present patent specification and claims will be readily obvious to one skilled in the art after reading this disclosure. Since a plurality of those means could assume a wide variety of embodiments, particularly setting forth each of those embodiments is neither practicable nor necessary. Nonetheless, this patent may in a plurality of locations incorporate by reference the disclosures of previous inventors to ensure unmistakably that one skilled in the art could understand and, in appropriate circumstances, practice the present invention.

In any event, one will appreciate that the means for announcing a receipt of an alarm signal could take the form of an acoustic annunciator such as a speaker, a visual display such as an LCD screen or LEDs, and/or a tactile annunciator such as a vibratory mechanism. Where a visual display is employed, it may act as a means for displaying alphanumeric indicia to indicate the particular type of security breach a protected article is experiencing.

In certain embodiments, the electronic device could be a vehicle sound-reproduction device, such as a stereo, CD player, or the like, with a body and a face. In such a case, the disabling member could form at least a portion of the face of the sound-reproduction device. A plurality of controls could be disposed on the disabling member for controlling functions of the vehicle sound-reproduction device whereby the plurality of controls comprise at least part of the disabling means. Certainly, the preferred disabling member will incorporate a power source, which can be rechargeable upon coupling to the body of the sound-reproduction device.

One particular disabling member can be formed with a first and second halves coupled by a hinge mechanism. With this, the disabling member can be folded to a compact configuration when detached from the sound-reproduction device.

In ways that will become readily obvious to one skilled in the art, the means for sending an alarm signal to the disabling member could do so by radio transmission and/or by mobile communications. Where both transmission methods are employed, the security system could employ radio transmission where practicable and mobile communications when required. Where radio communications is employed, the invention may be rendered still more effective by the inclusion of a means for providing an indication of when a user is venturing outside of a radio transmission communications area.

A preferred embodiment of the disabling member could further include a means for receiving a standard mobile communications paging signal. With this, the disabling member would carry out the tripartite function of disabling the electronic device, providing a remote indication of a security breach, and acting as a standard paging device. Furthermore, the disabling member could also operate as a mobile telephone with a plurality of controls that could be used both for operating the mobile telephone and the electronic device.

Certain embodiments of the invention could further include a means operably associated with the disabling member for affecting operation of a vehicle with which the security system is associated. This affecting could take the form of automatically preventing the vehicle from operating when the disabling member is removed from the vehicle. Alternatively or additionally, the disabling member could incorporate a means for selectively inducing the vehicle to operate or for preventing the vehicle from operating. Still further, it could induce the vehicle to exhibit an attention attracting function for giving notice to bystanders of a security breach. This could comprise an activation of a dedicated light source that is affixed to the vehicle or an activation of a smoke signal generator that is coupled to the vehicle.

In particular embodiments, the security system could provide an automatic emergency dialer, such as a single emergency dialing button, that comprises a means for automatically employing mobile communications to contact public emergency services in response to an activation of the emergency dialer.

It is also possible to have the means for sensing a breach in security to comprise a motion sensor that is operably associated with the sound-reproduction device body. Ideally, the motion sensor could be disposed on the sound-production device body in such a manner that it is covered by the disabling member when it is coupled to the sound-reproduction device body.

Still further, one could provide a charging stand for powering and recharging the disabling member when the disabling member is detached from the electronic device body. The charging stand could incorporate an amplifying acoustic annunciator for amplifying an acoustic annunciation provided by an acoustic annunciator of the disabling member.

The foregoing discussion broadly outlines the more important features of the invention to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION OF THE INVENTION

To ensure that one skilled in the art will fully understand and, in appropriate cases, be able to practice the present invention, certain preferred embodiments of the broader invention revealed herein are described below and shown in the accompanying drawing figures.

Figure 1:
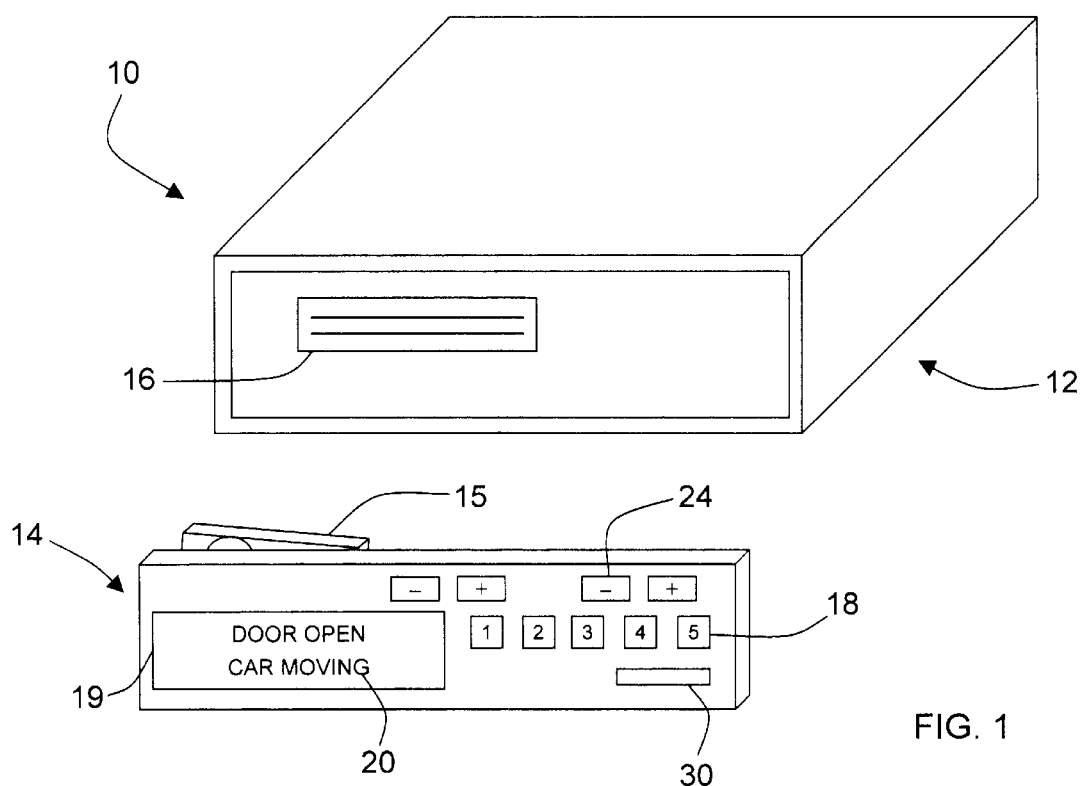
FIG. 1 is a perspective view of a security system according to the present invention.

Looking more particularly to the figures, one preferred embodiment of the present invention is shown in FIG. 1 where the auto security system is indicated generally at 10 and is shown to be founded on a stereo body 12, which may also be to termed an electronic device body 12 or a sound-reproduction device body 12, that is provided with a means for engaging a combination faceplate/pager 14, which for reasons that are herein made clear may be termed a disabling member 14.

It will be noted that one skilled in the art will be readily aware of a multitude of prior art stereos that employ a removable faceplate. Therefore, many of the basic aspects of the present device need not be explained in detail. Furthermore, one will be aware that certain alarm circuitry, alarm sensors, power circuitry, and other devices would be required to create a fully functioning alarm and stereo system. These are not and need not be shown or described with particularity as they are well known to one skilled in the art and are not critical to the present invention.

As with many prior art devices, the faceplate/pager 14 is provided with sets of controls 18 and 24 that allow a user to control stereo functions such as station and volume settings. The stereo body 12 may be operably connected to the faceplate/pager 14 by means of a connection 16 on the stereo body 12 that matingly engages a corresponding connection on the faceplate/pager 14. Appropriate means may be provided for allowing a power source within the faceplate/pager 14 to be recharged by the automobile's electrical system via the stereo body 14 when the faceplate/pager 14 is mounted on the stereo body 14. The faceplate/pager 14 further includes means for providing a visual annunciation in the form of a screen 19 for displaying alphanumeric indicia 20. When the faceplate/pager 14 is operably coupled to the stereo body 12, the alphanumerica indicia 20 may be employed to display information typically displayed on a radio's screen 19 such as the time or the radio station to which the radio is set.

However, the faceplate/pager 14 of the present invention departs from typical stereo faceplates in the major respect that it not only functions as a stereo faceplate but it also functions as a paging receiver. As such, it performs the multiple functions of allowing a user to control a stereo, allowing the user to prevent theft of that stereo by detaching the faceplate/pager 14 from the stereo body 12, and allowing a user to receive paging signals. Accordingly, the faceplate/pager 14 further includes a speaker 30 for providing an audible paging signal. Of course, other paging signals could well be employed. For example, the faceplate/pager 14 could be equipped additionally or alternatively with a means for producing a vibratory annunciation. With this, the faceplate/pager 14 could provide an effective signal to a user in situations where an audible annunciation may be ineffective or inappropriate. Still further, the faceplate/pager 14 could incorporate a clip 15 for allowing a user to retain the faceplate/pager 14 more conveniently.

In any event, one will note that the faceplate/pager 14 is more useful than a device that functions only as a stereo faceplate or only as a paging receiver. The dual functions of the faceplate/pager 14 make it more likely that a user will be willing to carry the device when he or she leaves the automobile. As a result, not only will a user enjoy the convenience of the two electronic devices being combined into one, but also the theft prevention advantages of the removable faceplate/pager 14 will be more likely to be exploited.

Although such a basic embodiment of the invention certainly would be useful, the invention is improved still further in that the faceplate/pager 14 cooperates with appropriate circuitry and sensors in the stereo body 12 and disposed in a protected automobile to give a user a remote indication of a security breach in the automobile. As such, the faceplate/pager 14 could be termed equally aptly a remote alarm indicator. The sensed security breach could be any of those typically sensed by auto security systems such as an opening of a door, a breaking of a window, a drain on the vehicle electrical system, a missing faceplate, or any other indication of a breach. The faceplate/pager 14 may further provide a notification to the user when the power source within the faceplate/pager 14 becomes low. Furthermore, the auto security system 10 could incorporate a means for preventing the automobile from starting when the faceplate/pager 14 is not in place.

When a security sensor detects a breach in the vehicle's security, not only will a provided alarm system trigger typical alarm indications, but alarm system components, possibly within the stereo body 12, also will trigger a paging signal to be sent to the removed faceplate/pager 14. With this, a user will be notified remotely that the protected vehicle's security has been breached. This will allow such a user to take immediate remedial measures. For instance, the user might return to the vehicle to attempt to ensure its security and/or the user might contact appropriate authorities to report a break-in to the vehicle or to activate a vehicle tracking system.

The inventor has realized that, while a basic remote indication in the form of an audible paging signal may be useful, a user receiving such a nondescript signal would know little other than that the automobile's security appears to have been breached. The particular type of breach would not be known. Knowing with some particularity what is happening to the automobile certainly would be useful as it would assist the user in determining what course of action should be taken. If the user were to know that the vehicle was moving, then he or she might be likely to pursue a different course of action than if it was learned that a window had been broken.

Advantageously, the present invention further includes a means for sending a detailed signal to the faceplate/pager 14 from the automobile alarm system, which means may be incorporated in the stereo body 12. The invention then exploits the screen 19 for displaying alphanumeric indicia 20 detailing the particular status of the protected automobile. For example, as it does in FIG. 1, the detailed signal may cause the screen 19 to indicate that the car door has been opened and the car is moving.

The means for sending a signal to the faceplate/pager 14 could simply be a standard device within the vehicle that exploits a common carrier paging network. However, in preferred embodiments, it may be particularly advantageous to include a means, such as radio transmission, for transmitting an alarm signal directly from the vehicle alarm system to the faceplate/pager 14 without exploiting the common carrier paging network. This may be accomplished in such a manner as was taught in U.S. Pat. No. 5,739,748 to Flick for a Method and Apparatus for Remotely Alerting a Vehicle User of a Security Breach, which is incorporated herein by reference. Such a practice advantageously would avoid incurring charges for making use of the paging network and would avoid any possible delays in the transmission of the paging signal, which would be peculiarly disadvantageous when one's vehicle is being stolen or otherwise violated.

Alternatively or additionally, the alarm signal could be sent to the pager first by non-cellular radio means (i.e., a radio transmission) that would be followed by the aforementioned cellular-type paging signal if the non-cellular radio means was unable to send an effective signal to the faceplate/pager 14. Furthermore, the auto security system 10 could include a means for sending a warning signal to the faceplate/pager 14 when the user is venturing out of range of the non-cellular radio means. The auto security system 10 could include a means for sending the cellular-type secondary page only if an appropriate response to the radio transmission is not received from the faceplate/pager 14.

One will appreciate that the faceplate/pager 14 could incorporate still further functions. For example, using well known technology, the faceplate/pager 14 could include a means for transmitting a signal to start and possibly turn off the automobile remotely. Such an ability would be uniquely useful in situations of severe weather where warming or cooling the automobile would be useful prior to a user's entering the automobile.

In a further refinement of the invention, the auto security system 10 may operate in stages. For example, the automobile may initially exhibit only typical alarm indications such as flashing lights and a sounding horn. If the security breach continues for a given amount of time or if the security breach is of an egregious type, the auto security system 10 may trigger the pager function to notify the user. With this in mind, one will appreciate that the term "pager" is not limited to the use of a cellular paging system but instead applies the term "pager" in its broader definition of "to summon or call a person" without regard to the particular means employed to do so.

Figure 2:
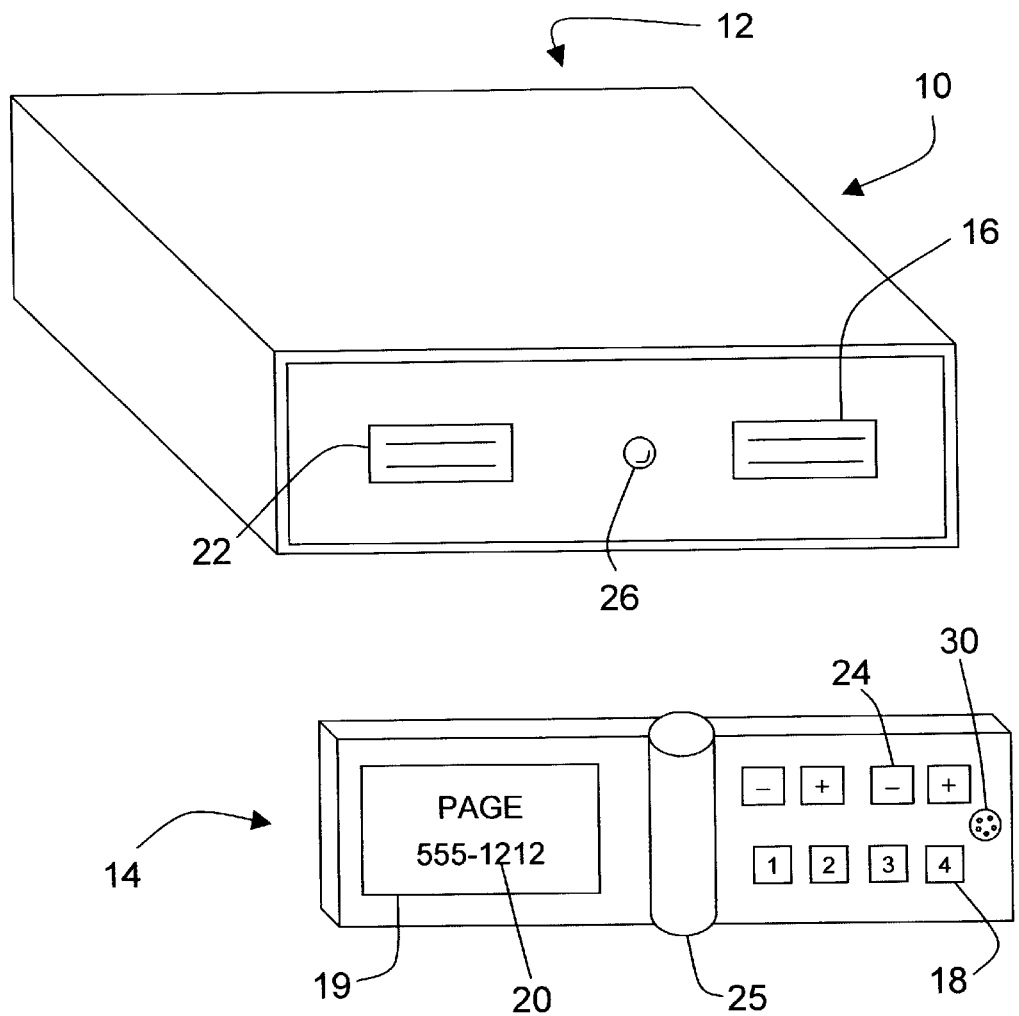
FIG. 2 is a perspective view of an alternative embodiment of a security system according to the present invention.

FIG. 2 shows another embodiment of the auto security system 10, which again includes a stereo body 12 and a faceplate/pager 14. The faceplate/pager 14 again includes controls 18 and 24 and a screen 19 for displaying alphanumeric indicia 20. In FIG. 2, the faceplate/pager is performing as a traditional paging receiver as it is giving a visual indication of an incoming page by means of the alphanumeric indicia 20.

In the embodiment of FIG. 2, however, the faceplate/pager 14 is modified in that it includes a central hinge 25. With this, the body of the faceplate/pager 14 is able to be folded in half when removed from the stereo body 12 to provide a user with still greater convenience in carrying the removed faceplate/pager 14. Since the faceplate/pager 14 is substantially divided into two halves by the hinge 24, the stereo connector 16 is supplemented by a second stereo connector 22.

A further refinement of the embodiment shown in FIG. 2 derives from the to provision of a motion sensor system, which is exemplified by a motion sensor eye 26. The motion sensor eye 26 is coupled with unshown circuitry and the like that is necessary for its function to act as a motion sensor system. The motion sensor system may be of any type suitable for sensing the presence of an intruder within the automobile. U.S. Pat. No. 4,551,711 to Shoichi et al., U.S. Pat. No. 5,369,269 to Masahiko et al., and U.S. Pat. No. 5,819,124 to Somner et al. each disclose systems that could be effective for use relative to the present motion sensor system. Accordingly, each of these patents is incorporated herein by reference.

One will appreciate that the motion sensor eye 26 is covered by the faceplate/pager 14 when the faceplate/pager 14 is coupled to the stereo body 12. Thus, the motion sensor eye 26 is inoperable when the faceplate/pager 14 is thus located. When the faceplate/pager 14 is removed from the stereo body, however, the motion sensor eye 26 is revealed.

Advantageously, the motion sensor system includes a means for activating the motion sensor eye 26 at an appropriate juncture after the faceplate/pager 14 has been removed. This activation could occur, for example, a given amount of time after the faceplate/pager 14 has been removed from the stereo body 12 for allowing a user to leave the automobile. Alternatively, the activation could occur upon the occurrence of a specified event, such as the closing of the last of the automobile's open doors. With the motion sensor system in place, the auto security system 10 would be able to sense the presence of an intruder in the vehicle and provide the user with a specific indication to that effect by means of the alphanumeric indicia 20 on the faceplate/pager 14.

Figure 3:
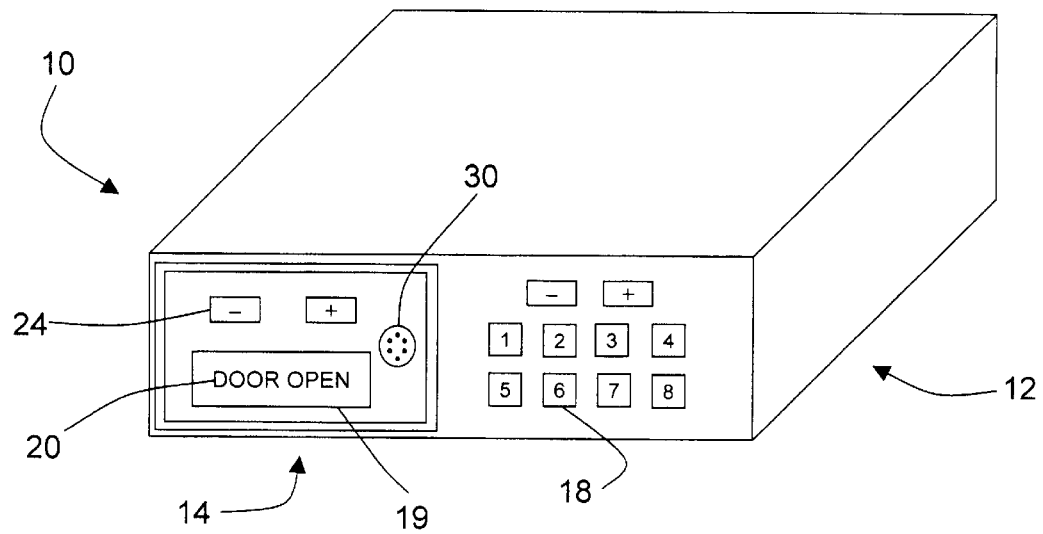
FIG. 3 is a perspective view of still another alternative embodiment of a security system according to the present invention.

FIG. 3 depicts yet another embodiment of the auto security system 10. Again, the auto security system 10 takes advantage of a combination faceplate/pager 14 that is removably coupled to a stereo body 12. In this embodiment, however, the faceplate/pager 14 comprises just a portion of the overall face of the stereo body 12. With this, the faceplate/pager 14 is still more convenient for a user to transport. Although it may be possible to have all controls 18 and 24 on the faceplate/pager, in this embodiment one set of controls 18 is disposed on the face of the stereo body 12 while the other set of controls 24 is disposed on the faceplate/pager 14. Of course, the screen 19 again is incorporated into the faceplate/pager 14.

Figure 4:
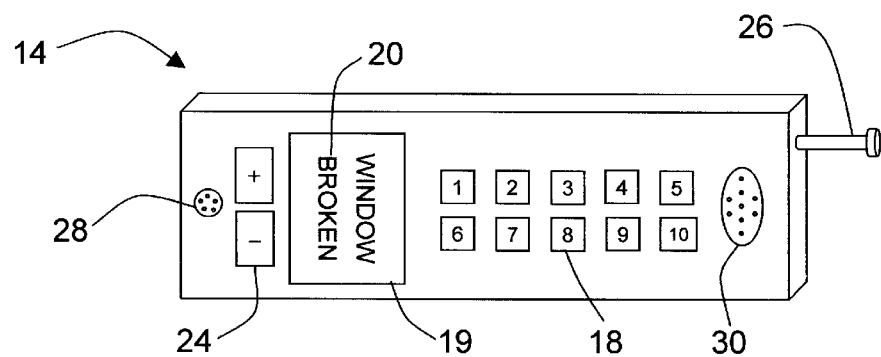
FIG. 4 is a perspective view of an alternative disabling member according to the present invention.

Looking next to FIG. 4, one sees yet another embodiment of the faceplate/pager 14. This faceplate/pager 14 includes each of the elements set forth relative to the previously described faceplate/pagers 14. However, this device further comprises a mobile telephone and therefore may be termed a faceplate/pager/telephone 14. Accordingly, the faceplate/pager/telephone 14 further includes a microphone 28 and an extendible antenna 26. Advantageously, the controls 18 are operative not only for controlling the stereo aspect of the invention, but they also act to control the functions of the faceplate/pager/telephone 14 in its function as a telephone.

Figure 5:
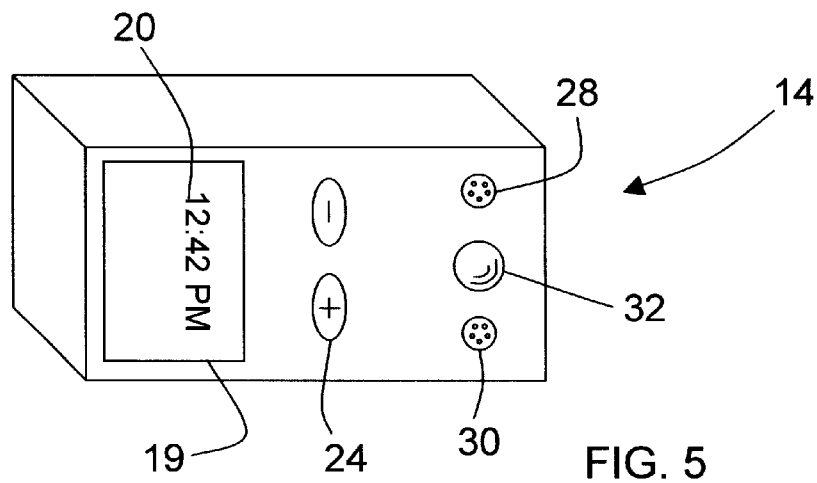
FIG. 5 is a perspective view of a still further embodiment of a disabling member according to the present invention.

The faceplate/pager. 14 shown in FIG. 5 again incorporates a microphone 28, a speaker 30, controls 24, and a screen 19 for displaying alphanumeric indicia 20. In this case, the alphanumeric indicia 20 depict the invention's ability to display other information, such as the time of day. However, this embodiment supplements the stereo control and pager functions with an emergency dialing feature for allowing a user to contact 911 emergency services automatically by pressing a single emergency dialing button 32. As such, the device may be termed a faceplate/pager/emergency dialer 14. Such an embodiment may be considered particularly advantageous in light of the fact that cellular telephone networks presently are obligated to allow the contacting of 911 emergency services by cellular devices even if those devices are not activated members of any cellular network. As a result, a user of this embodiment of the invention will enjoy the added safety and security of being able to procure emergency assistance without a need for cellular service activation or the typical charges associated therewith.

Figure 6:
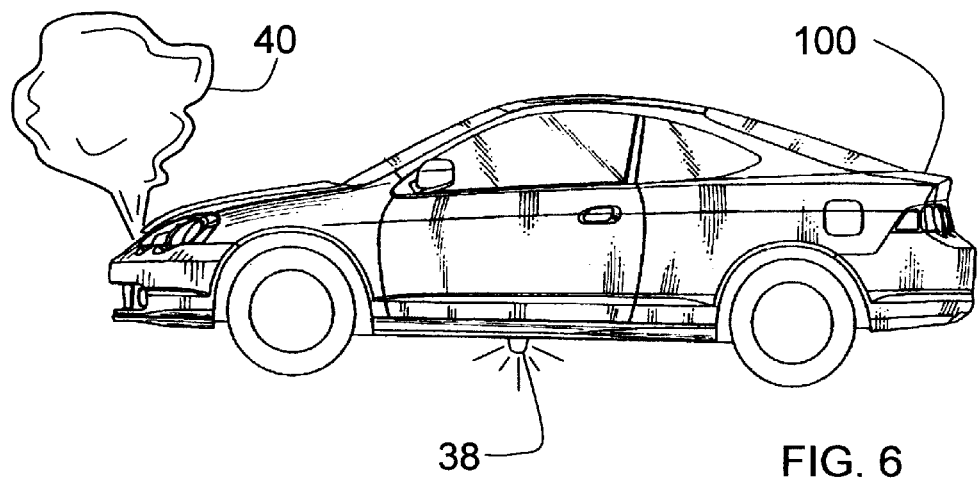
FIG. 6 is a view in side elevation of a preferred embodiment of the present invention shown relative to an automobile.

In FIG. 6, one sees yet another potential refinement of the invention wherein the auto security system (not shown) is shown to activate a dedicated strobe light 38 that may be affixed to the undercarriage of an automobile 100. The strobe light 38 may activate automatically immediately upon or within a specified time after a breach in an automobile's 100 security. Alternatively, the strobe light 38 may be activated by a user's entering a specific code into the auto security system 10 by means of the controls 18 and/or 24. Furthermore, the auto security system 10 could be employed to activate other types of signals that the automobile 100 is being operated without the owner's authorization. For example, with an inputting of a code or the like, a user could employ the faceplate/pager 14 to affect the operation of the automobile to cause the automobile 100 to emit a smoke signal 40. Any appropriate means could be employed in the automobile 100 for producing the smoke signal 40. For example, a smoke producing canister could be hidden in an appropriate location on the automobile 100 (i.e., on the undercarriage, in the bumper, etc.).

Of course, the controls 18 and/or 24 could be used as means for otherwise affecting the operation of the automobile. For example, in response to a signaling of a breach in the vehicle's security at the faceplate/pager 14, a user could operate the controls 18 and/or 24, for example, to disable the vehicle's ignition or fuel supply, flash the vehicle's lights, sound the vehicle's horn, or lock the vehicle's doors. Providing means to accomplish such results is certainly well within the ability of one knowledgeable and skilled in the art.

Figure 7:
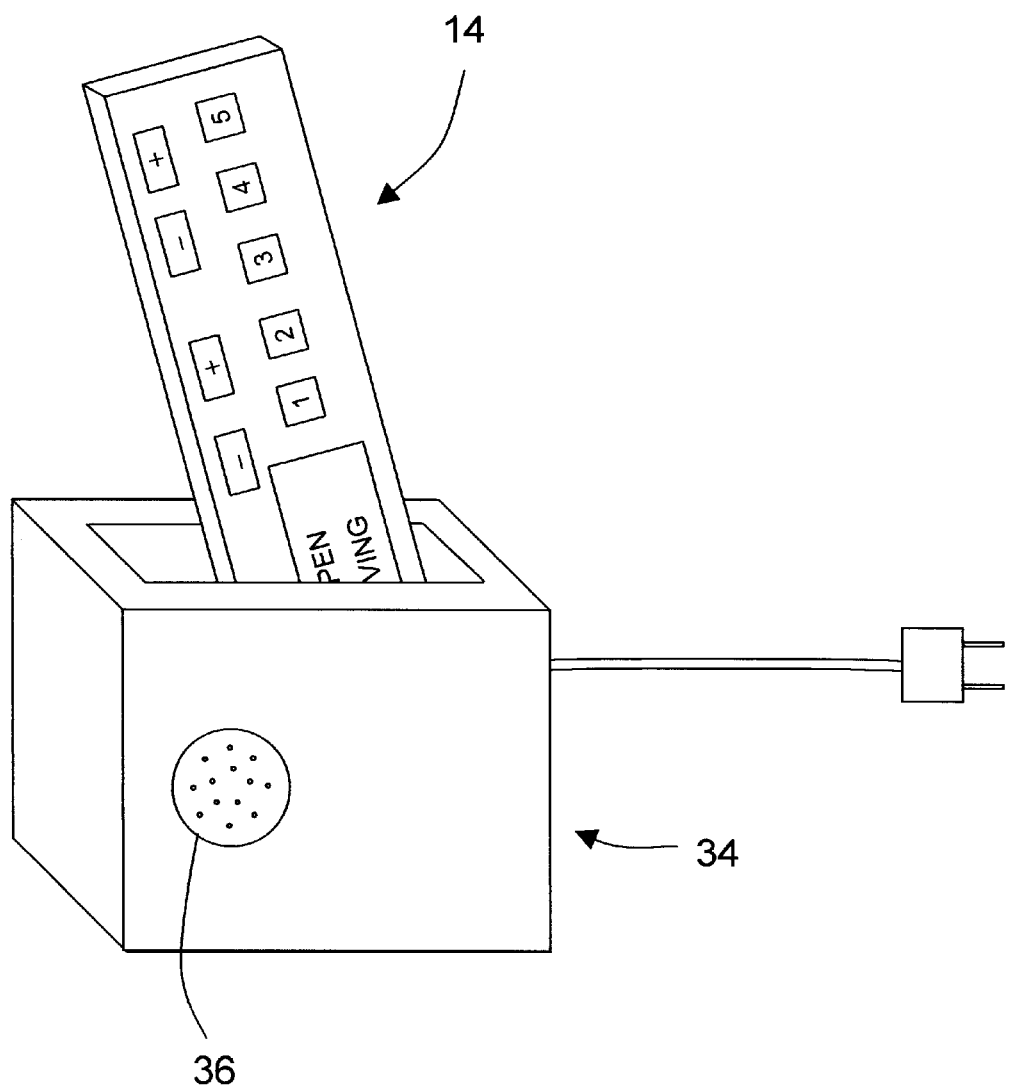
FIG. 7 is a perspective view of an embodiment of the disabling member shown coupled with a charging stand according to the present invention.

Finally, FIG. 7 shows another potential refinement of the invention in the form of a charging stand 34 for placing or maintaining the faceplate/pager 14 in a fully charged and operative condition. Such a charging stand 34 would be particularly useful, for instance, when a faceplate/pager 14 is expected to remain removed from the automobile for an extended period of time or where the device is used extensively as a cellular telephone or pager. The charging stand 34 is rendered still more useful by the provision of an amplifying speaker 36 that is operably connected to the faceplate/pager 14 when the faceplate/pager 14 is retained by the charging stand 34. The amplifying speaker 36 amplifies, supplements, or supersedes the audible signal provided by the basic speaker 30 of the faceplate/pager 14. Such an amplifying speaker would enable the faceplate/pager 14 to give a user notification of a security breach even when the user is not in the immediate proximity of the faceplate/pager 14.

From the foregoing, it will be clear that the present invention has been shown and described with reference to certain preferred embodiments that merely exemplify the broader invention revealed herein. Certainly, those skilled in the art can conceive of alternative embodiments. For instance, those with the major features of the invention in mind could craft embodiments that incorporate those major features while not incorporating all of the features included in the preferred embodiments.

With the foregoing in mind, the following claims are intended to define the scope of protection to be afforded the inventor, and the claims shall be deemed to include equivalent constructions insofar as they do not depart from the spirit and scope of the present invention. A plurality of the following claims express certain elements as a means for performing a specific function, at times without the recital of structure or material. As the law demands, these claims shall be construed to cover not only the corresponding structure and material expressly described in the specification but also equivalents thereof.

I claim as deserving the protection of Letters Patent:

1. A security system for providing a remote indication of a breach in security comprising:
    an electronic device comprising an electronic device body;
    a disabling member removably and replaceably couplable to the electronic device body;
    a means for at least partially disabling the electronic device when the disabling member is removed from the electronic device body;
    a means for sensing a breach in security;
    a means for sending an alarm signal to the disabling member in response to a sensing of a breach of security by the means for sensing a breach in security;
    a means operably associated with the disabling member for receiving an alarm signal sent by the means for sending an alarm signal; and
    a means operably associated with the disabling member for announcing a receipt of an alarm signal by the means for receiving an alarm signal;
    whereby the disabling member functions not only to disable the electronic device when the disabling member is removed from the electronic device body but the disabling member also functions to provide a remote indication of a security breach.

2. The security system of claim 1 wherein the means for announcing a receipt of an alarm signal comprises an acoustic annunciator.

3. The security system of claim 1 wherein the means for announcing a receipt of an alarm signal comprises a visual display.

4. The security system of claim 3 wherein the visual display comprises a means for displaying alphanumeric indicia indicative of a type of security breach whereby the security system can provide a user with a particular indication of a type of security breach.

5. The security system of claim 1 wherein the electronic device comprises a vehicle sound-reproduction device with a vehicle sound-reproduction device body for being mounted within a vehicle.

6. The security system of claim 5 wherein the vehicle sound-reproduction device further comprises a vehicle sound-reproduction device face and wherein the disabling member comprises at least a portion of the vehicle sound-reproduction device face.

7. The security system of claim 6 further comprising a plurality of controls disposed on the disabling member for controlling functions of the vehicle sound-reproduction device whereby the vehicle sound-reproduction device is without the plurality of controls when the disabling member is removed from the vehicle sound-reproduction device and whereby the plurality of controls comprise at least part of the means for at least partially disabling the sound-reproduction device.

8. The security system of claim 7 further comprising a power source operably associated with the disabling member for providing power to the disabling member when the disabling member is removed from the sound-reproduction device body.

9. The security system of claim 8 wherein the power source is rechargeable.

10. The security system of claim 6 wherein the disabling member comprises just a portion of the vehicle sound-reproduction device face.

11. The security system of claim 6 wherein the disabling member comprises a first half and a second half wherein the first half and the second half are coupled by a hinge mechanism whereby the disabling member can be folded to assume a compact configuration.

12. The security system of claim 1 wherein the means for sending an alarm signal to the disabling member comprises a means for sending an alarm signal by radio transmission.

13. The security system of claim 12 wherein the means for sending an alarm signal by radio transmission comprises a primary means for sending an alarm signal and wherein the means for sending an alarm signal further comprises a secondary means for sending an alarm signal that comprises a means for sending an alarm signal by mobile communications whereby the security system can employ radio transmission where practicable and whereby the security system alternatively can employ mobile communications when required.

14. The security system of claim 12 further comprising a means for providing an indication of when a user is venturing outside of a radio transmission communications area.

15. The security system of claim 1 wherein the means for sending an alarm signal to the disabling member comprises a means for sending an alarm signal by mobile communications.

16. The security system of claim 1 wherein the disabling member further comprises a means for receiving a standard mobile communications paging signal whereby the disabling member functions not only to disable the electronic device and to provide a remote indication of a security breach but also to act as a standard paging device.

17. The security system of claim 7 further comprising a means operably associated with the disabling member for affecting operation of a vehicle with which the security system is associated.

18. The security system of claim 17 wherein the means for affecting operation of a vehicle with which the security system is associated comprises a means for automatically preventing the vehicle from operating when the disabling member is removed from the vehicle.

19. The security system of claim 17 wherein the means for affecting operation of a vehicle with which the security system is associated comprises a means operably associated with the disabling member for selectively inducing the vehicle to operate or for preventing the vehicle from operating.

20. The security system of claim 17 wherein the means for affecting operation of a vehicle with which the security system is associated comprises a means for inducing the vehicle to exhibit an attention attracting function for giving notice to bystanders of a security breach.

21. The security system of claim 20 wherein the attention attracting function comprises an activation of a light source that is affixed to an underside of the vehicle.

22. The security system of claim 20 wherein the attention attracting function comprises an activation of a smoke signal generator that is coupled to the vehicle.

23. The security system of claim 1 wherein the disabling member further comprises a mobile telephone with a plurality of controls.

24. The security system of claim 23 wherein the plurality of controls further operate to control the electronic device when the disabling member is coupled thereto.

25. The security system of claim 1 further comprising an automatic emergency dialer that comprises a means for automatically employing mobile communications to contact public emergency services in response to an activation of the emergency dialer.

26. The security system of claim 25 wherein the emergency dialer is activated by a pressing of a single emergency dialing button.

27. The security system of claim 6 wherein the means for sensing a breach in security comprises a motion sensor operably associated with the sound-reproduction device body for sensing motion within a vehicle.

28. The security system of claim 27 wherein the motion sensor is disposed on the sound-production device body to be covered by the disabling member when the disabling member is coupled to the sound-reproduction device body.

29. The security system of claim 2 further comprising a charging stand for powering and recharging the disabling member when the disabling member is detached from the electronic device body and further comprising an amplifying acoustic annunciator operably associated with the charging stand for amplifying the acoustic annunciation provided by the acoustic annunciator of the disabling member.

30. A security system for providing a remote indication of a breach in security comprising:

a remote indication member;

a means for sensing a breach in security in a protected vehicle;

a means for sending an alarm signal to the remote indication member in response to a sensing of a breach of security by the means for sensing a breach in security;

a means operably associated with the remote indication member for receiving an alarm signal sent by the means for sending an alarm signal;

a means operably associated with the remote indication member for announcing a receipt of an alarm signal by the means for receiving an alarm signal; and an amplifying stand for coupling with the remote indication member wherein the amplifying stand has an operably associated acoustic annunciator for providing an acoustic annunciation of a security breach.

31. The security system of claim 30 wherein the amplify stand further comprises a means for electrically charging the remote indication member.

* * * * *